United States Patent [19]

Sugimori

[11] Patent Number: 4,636,619
[45] Date of Patent: Jan. 13, 1987

[54] HEATER CONTROL DEVICE

[76] Inventor: Hideo Sugimori, 12-2 Koaza Shimokubota, Ohaza Hohsono, Seikacho, Sohrakugun, Kyoto-fu, Japan

[21] Appl. No.: 744,886

[22] Filed: Jun. 14, 1985

Related U.S. Application Data

[63] Continuation of Ser. No. 499,428, May 31, 1983, abandoned.

[30] Foreign Application Priority Data

May 31, 1982 [JP] Japan ................................ 57-093304
May 31, 1982 [JP] Japan ................................ 57-093305

[51] Int. Cl.$^4$ ............................................. H05B 1/02
[52] U.S. Cl. ..................................... 219/497; 219/499; 219/501; 323/235

[58] Field of Search ............... 219/494, 499, 497, 501, 219/486, 508, 506; 323/321, 235, 236

[56] References Cited

U.S. PATENT DOCUMENTS

| | | | |
|---|---|---|---|
| 3,789,190 | 1/1974 | Orosy et al. | 219/497 |
| 4,086,466 | 4/1978 | Scharlack | 219/501 |
| 4,348,582 | 9/1982 | Budek | 219/486 |

Primary Examiner—M. H. Paschall
Attorney, Agent, or Firm—Wenderoth, Lind & Ponack

[57] ABSTRACT

A heater control device in which a heater is made to double as a temperature sensor so as to eliminate the leading wires used exclusively for the temperature sensor. The heater control device includes a zero-crossing detector which generates a short duration pulse signal each time an AC power voltage is crossing the zero-level. The heater acts as a temperature sensor only for the short duration of the pulse signal.

1 Claim, 4 Drawing Figures

HEATER CONTROL DEVICE

This application is a continuation, of now abandoned application Ser. No. 499,428, filed May 31, 1983.

BACKGROUND OF THE INVENTION

The present invention relates to a heater control device, and more particularly to an improved heater control device in which a heater doubles as a temperature sensor for the purpose of eliminating the leading wires to be used exclusively for a temperature sensor.

Figure 1:
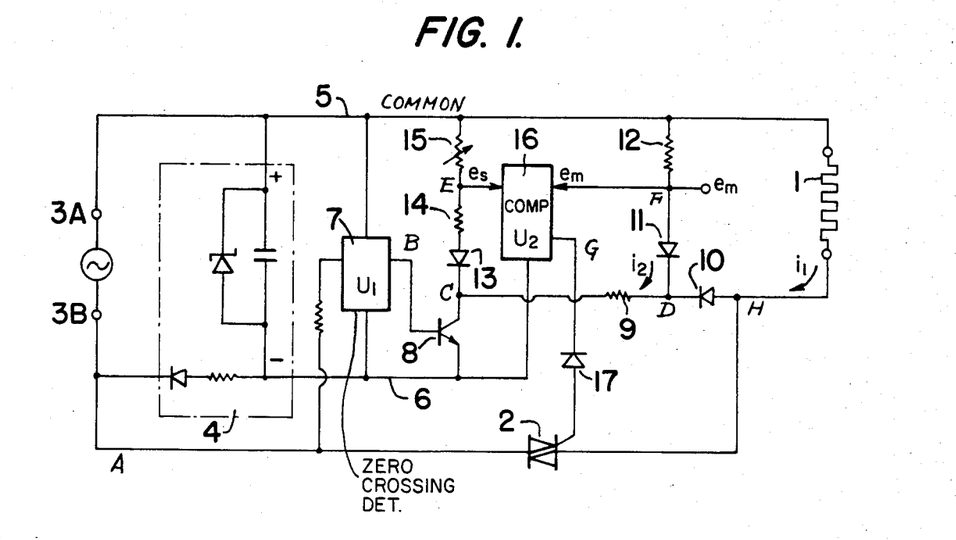
FIG. 1 shows a circuit diagram of a conventional heater control device.

There is shown in FIG. 1 a circuit diagram of a conventional heater control device. In the figure a heater $1p$ is power-supplied from an A.C power source $18p$ through a bidirectional thyristor $2p$ connected in series with the heater. The thyristor $2p$ is gated by a switching signal from a control circuit to which a temperature signal of a sensor $6p$ is input, the control circuit comprises a comparator, a zero-crossing detector and a variable standard voltage circuit which provides a standard voltage corresponding to a predetermined value of temperature. The comparator compares a temperature signal from the temperature sensor $6p$ with the standard voltage, and outputs a trigger signal to the gate terminal of the thyristor $2p$. On the other hand the zero-crossing detector is a circuit device which produces a pulse signal each time the instantaneous absolute value of the A.C power source voltage become smaller than a certain definite value. A diode $17p$ and capacitor $14p$ constitute a D.C power source to be supplied to the temperature sensor $6p$ and the control circuit. The control circuit, as a whole is devised so as to put the comparator into action only for the duration of the pulse signal produced by the zero-crossing detector. The comparator thus outputs to the thyristor $2p$ a trigger pulse with the same width as that of the pulse signal produced by the zero-crossing detector, only while the temperature is lower than the predetermined temperature value. Therefore, the heater $1p$ is energized with the thyristor $2p$ made conducting until the temperature of an object to be heated rises up to the predetermined value of temperature. However, such a circuit construction has a disadvantage that, in case the heater and the temperature sensor must be set remote from the main part of the device, the device needs two pairs of leading wires: one pair is for the heater and the other for the temperature sensor. A multiplicity of leading wires is apt to make a source of trouble due to the breakage of a wire. Particularly the breakage of the sensor wire may cause an uncontrolled running of the heater.

OBJECTS AND SUMMARY OF THE INVENTION

An object of the present invention is to provide a heater control device which is devised so as to need only one pair of leading wires by making a heater double as a temperature sensor. Another object of the present invention is to provide a heater control device in which a heat dissipation from the control circuit is reduced to a several-tenth in comparison with conventional devices, so as to enable the device to be assembled in a narrow space such as the inside space of the grip of an iron or a hairdryer. A further object of the present invention is to provide a heater control device which works sensitively and precisely with an operating D.C power source voltage kept much lower than a commercial A.C power voltage supplied to the heater.

According to the present invention a heater which is to be power-supplied from an A.C power source through an A.C power switching element constitutes a bridge circuit together with accompanying resistors. This bridge circuit is made active to enable the heater to act as a temperature sensor only for a short duration of a zero-crossing period of the A.C power instantaneous voltage. A temperature measured by the heater acting as a sensor is compared by a comparator with a reference voltage which corresponds to a predetermined temperature value. The reference voltage is also output from the bridge circuit. If the temperature is lower than the predetermined temperature value, the comparator outputs a trigger pulse to the gate of the A.C power switching element, and makes the heater energized with the A.C power. The present invention can be embodied with diodes incorporated in the bridge circuit to protect the control circuit more securely from the A.C power voltage.

BRIEF DESCRIPTION OF THE DRAWINGS

FIG. 5 shows an embodiment of a display device for use in connection with the present invention.

FIG. 6 shows a circuit construction of a further embodiment of the present invention FIG. 7 shows a circuit example of a zero-crossing detector to be used in the present invention.

FIG. 8 shows the voltage and current wave forms observed at various points in the circuit shown in Fig. 2.

DETAILED DESCRIPTION OF THE INVENTION

Figure 2:
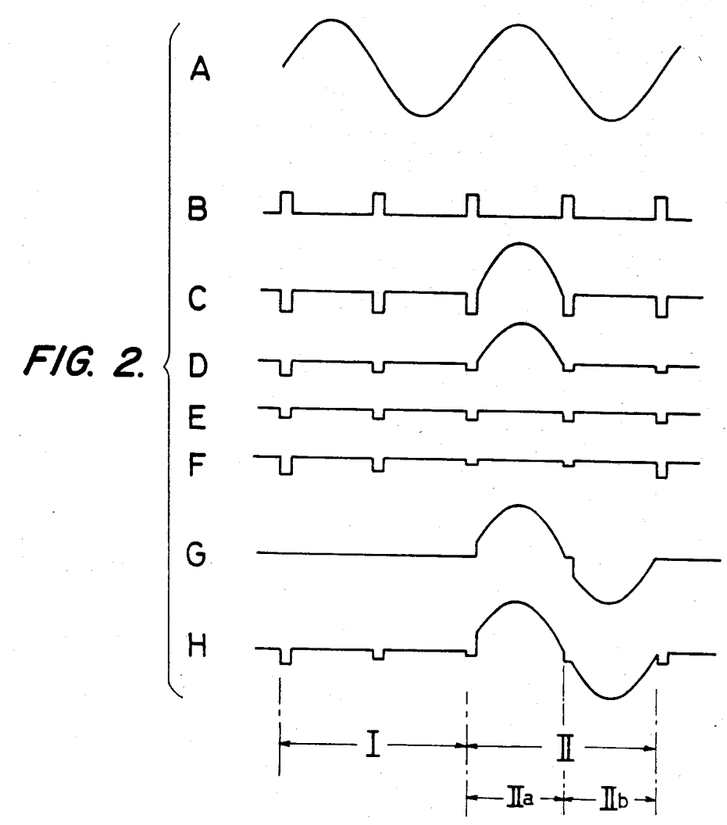
FIG. 2 shows a circuit construction of an embodiment of the present invention.

There is shown in FIG. 2 a circuit construction of an embodiment of the present invention. A heater $1b$ is power-supplied from an A.C power source $18b$. Resistors $7b$, $8b$, $9b$ and $10b$ and the heater $1b$ constitute a bridge circuit, to which a D.C operating current is supplied from a D.C power source $13b$ through a switching transistor $11b$. A zero-crossing detector $12b$ outputs, a switching pulse signal to the transistor $11b$ each time the instantaneous voltage of the A.C power source $18$ is crossing the zero level, and makes the transistor conducting only for a duration of the switching pulse. Comparator $4f$ and $4g$ constitute a wired NOR logic together with a resistor $32$. A reference voltage which corresponds to a predetermined temperature value is input to the non-inverting input terminal of the comparator $4g$ from the variable resistor $9b$, while a temperature signal is input to the inverting input terminal of the same comparator $4g$ from a point where the resistor $7b$ and the heater are connected to each other. A capacitor $33$ and a resistor $34$ constitute a differentiating circuit, whose output is led to the non-inverting input terminal of a comparator $4h$. The comparator outputs a switching signal to a transistor $37$ through which a trigger current is supplied to thyristor $2b$ from the D.C power source $13b$. In such a circuit construction, while the zero-crossing detector $12$ does not generate a pulse signal, that is, the bridge circuit is kept not supplied with a current the output of the wired NOR logic is kept low irrespective of the output of the comparator 4g, because the output of the comparator 4f is kept low. With the bridge circuit supplied with a current, the comparator 4f turns to a high level so that, if the output voltage of the heater 1b acting as a temperature sensor is higher than the reference voltage obtained from the resistor 9b, the output of the comparator 4g and, therefore, that of the entire wired NOR logic turns to a high level. The differentiating circuit consisting of the capacitor 33 and the resistor 34 makes a positive and a negative pulses from the output of the wired NOR logic correspondingly to the rise-up and the fall-down edges of the pulse signal of the zero-crossing detector. That negative pulse triggers the thyristor 2b through the comparator 36, transistor 37 and a diode 38, and makes the thyristor 2b conducting. Thus the heater 1b is kept energized only while a temperature measured is lower than the predetermined temperature value. The time charts shown in FIG. 8 show, in the order from the top down to the bottom, the voltage of the A.C power source, the output voltage of the wired NOR logic, the input of the differentiating circuit, the current through the transistor 37 or the diode 38 and the current supplied to the heater 1b, respectively.

In the following another embodiment of the present invention is described in conjunction with FIG. 3. In the figure all the circuit components which correspond to those shown in FIG. 2 are given the same reference number with the suffix changed to c from b. The description of these components are omitted. Resistors 31, 32, 7c and a heater 1c constitute a resistance bridge, while diodes 33, 35 and 36 are to protect the bridge from the A.C power voltage supplied from an A.C power source 18c. This embodiment is devised so as to obtain a temperature signal not directly from the heater 1c acting as a temperature sensor but from the resistor 34 whose resistance value is chosen much larger than the resistance of the heater 1c. The voltage appearing on the resistor 34 can be made exactly reflect the voltage developed on the heater 1c by choosing the forward voltage of the diode 35 equal to that of the diode 36. The general performance of this embodiment is similar to the case of the preceeding embodiment. A zero-crossing detector 12c operates a switching transistor 11c with its output pulse signal, while a comparator 4c compares a temperature signal $e_m$ obtained from a point F with a reference voltage $e_s$ given at a point E. If the temperature signal $e_m$ is smaller than the reference voltage $e_s$, the comparator output a negative trigger pulse and triggers bidirectional thyristor 2c through a diode 37 after the end of the zero-cross signal, as is the case of the embodiment shown in FIG. 2. The comparator 4c corresponds the circuit consisting of the wired NOR logic, the comparator 4g and relative components in FIG. 2. The time charts A to H shown in FIG. 4 correspond to the voltage at points A to H in FIG. 3, respectively.

There is shown in FIG. 6 a further embodiment of the present invention. In FIG. 6 all the components which correspond to those shown in FIGS. 2 and 3 are given the same reference number with the suffix changed to a. Diodes 20 and 21 are inserted to protect a bridge circuit consisting of resistors 7a, 8a, 9a, and 10a and a heater 1a from a A.C power source 18a. In this embodiment, when a A.C power voltage is crossing the zero level from the minus side toward the plus side, a pulse signal generated from a zero-crossing detector 12a makes a transistor 11 conducting to supply a current to the bridge circuit. At this time, if a temperature signal input to the non-inverting terminal of the comparator 4a is smaller than a reference voltage at the inverting terminal, the comparator output becomes low, and a capacitor 23 is discharged through a diode 25. After the pulse signal is over, the capacitor 23 is charged through a resistor 22, because a transistor provided at the output stage in the comparator 4a is cut off. The current charging the capacitor triggers a directional thyristor 2a through a diode 24, so that the heater 1a is supplied with a positive half cycle of the A.C current from an A.C power source 18a. During a minus half cycle the current does not flow, because the thyristor 2a is of a unidirectional type. In case the temperature exceeds a predetermined temperature, the comparator output is kept high irrespective of the pulse signal from the zero-crossing detector 12a, so that the thyristor 2a is not triggered.

FIG. 5 shows an example of a display apparatus for displaying the temperature value $e_m$ which is measured each time the pulse signal is output from the zero-crossing detector. In the figure operational amplifiers 51 and 64 constitute an impedance converting circuit 50 and an adding circuit 52, respectively. The output $e_{m2}$ of the adding circuit 52 is given by an equation below, if $e_{m1}$ and $E_{REF}$ are input thereto:

$$e_{m2} = -\left( \frac{R_2}{R_1} e_{m1} + \frac{R_2}{R_3} E_{REF} \right)$$

where $R_1$, $R_2$ and $R_3$ are the resistance value of resistors 53, 63 and 62, respectively. An operational amplifier 61 constitutes a circuit to output a positive standard voltage $E_{REF}$ with a positive DC voltage E being input. A pulse signal from the zero-crossing detector is input to the gate of a FET 54 to make the FET conducting for the duration of the pulse signal. A sample holding circuit 55 holds the value $e_{m2}$, which is renewed for each pulse signal from the zero-crossing detector. An A-D converter 57 converts the output of the sample holding circuit to a digital value, which is visually shown on a display 56. By adjusting a resistance $R_3$ of the resistor 62 so that the output voltage may become 0 at a heater temperature of 0° C., the output is proportional to a measured temperature.

FIG. 7 shows a circuit example of a zero-crossing detector, for which a commercially available IC unit may be used. In this circuit an A.C voltage is input between terminals 70 and 72, and a negative D.C source is supplied to a terminal 77. A terminal 79 is the output terminal of the whole circuit. An integrating circuit 82 consisting of resistor 80 and a capacitor 81 is provided to delay the phase of an input A.C voltage. While the absolute value of the output of the integrating circuit is efficiently high, either transistor 73 or 74 is alternately made conducting, and a transistor 75 is kept inactive, because the potential of its base rises substantially up to the common line potential due to the voltage developed in a resistor 76. The transistor 75 is made conducting only in a short time-width in which both of the transistors 73 and 74 are kept non-conducting due to the falling down of the absolute output of the integrating circuit 82 to a level equal to or lower than the emitter-base cut-off voltage of both the transistors 73 and 74. The width of the pulse signal obtained by this zero-crossing detector circuit is about 100 μ sec, while that of a conventional zero-crossing detector is about 300 to 400 μ sec.

The present invention, as is understood from the description given above, has the following advantages:

Only one pair of leading wires is needed, because the heater doubles as a temperature sensor. Therefore a heater control device based on the present invention is advantageously applicable particularly to such a device as iron and a hair dryer in which the temperature of the heater itself is an object to be controlled; and The electric power consumed by the control circuit is largely reduced, because the circuit is supplied with an operating D.C power only for a duration of the pulse signal generated by a zero-crossing detector.

What is claimed is:

1. A heater control device in which a heater element to be temperature-controlled doubles as a temperature sensor, said heater element being supplied from an AC power source through an AC power switching element except when said heater element is acting as said temperature sensor, said heater control device comprising:

a zero-crossing detector means for generating a pulse signal each time an instantaneous absolute voltage value of said AC power source becomes smaller than a predetermined value, said pulse signal causing said heater element to act as said temperature sensor;

a DC power source for supplying current for operating said heater control and for providing a temperature sensing circuit voltage to said heater element when said element is being utilized as a temperature sensor;

a DC current switching element for providing a sensing excitation voltage in accordance with said pulse signal generated by said zero-crossing detector means;

a circuit means connected to said heater element and responsive to said sensing excitation voltage for providing a reference voltage corresponding to a predetermined control temperature value, and for sensing a temperature sensing signal which corresponds to an exciting sensing voltage from said heater element when said element is being utilized as a temperature sensor;

a comparator means for comparing said temperature sensing signal with said reference voltage;

wherein said AC power switching element is operated by said comparator means in accordance with the polarity of the difference between said temperature sensing signal and said reference voltage;

wherein said circuit means is a bridge circuit which comprises:

a variable voltage-divider circuit for generating said reference voltage in one leg of said bridge circuit;

a resistor connected in series with a load impedance, said load impedance, connected in parallel with said heater element, wherein said resistor, said load impedance and said heater element constitute another leg of said bridge circuit;

and a means for preventing an AC voltage from said AC power source to be imposed on said reference voltage and on said temperature sensing signal;

and wherein said preventing means comprises:

a first diode connected in series between said resistor and said heater element, an anode of said first diode being connected to a connecting point of said heater element and said AC power switching element;

a second diode connected in series between said resistor and said load impedance, an anode of said second diode being connected to said load impedance;

a third diode connected in series between said DC current switching element and said variable voltage-divider circuit, a cathode of said third diode being connected to said DC current switching element;

and wherein said temperature sensing signal is generated at a connecting point between said load impedance and said second diode.

* * * * *

UNITED STATES PATENT AND TRADEMARK OFFICE
CERTIFICATE OF CORRECTION

PATENT : 4,636,619

DATED : January 13, 1987

INVENTOR(S) : Hideo SUGIMORI

It is certified that error appears in the above-identified patent and that said Letters Patent is hereby corrected as shown below:

Columns 1-4 and column 5, lines 1-15, the text should be deleted and substitute therefor the text as shown on the attached pages.

UNITED STATES PATENT AND TRADEMARK OFFICE
CERTIFICATE OF CORRECTION

PATENT NO. : 4,636,619
DATED : January 13, 1987
INVENTOR(S) : Hideo SUGIMORI

It is certified that error appears in the above-indentified patent and that said Letters Patent is hereby corrected as shown below:

--HEATER CONTROL DEVICE

This application is a continuation of now abandoned application Ser. No. 499,428, filed May 31, 1983.

BACKGROUND OF THE INVENTION

The present invention relates to an apparatus for sensing temperature with an electric resistor, and more particularly to a heater control apparatus devised to make the heater double as a temperature sensor for measuring temperature at zero-crossings of the A.C. power source supplied to the heater, and to on-off control the A.C. current at each half cycle of it just following each zero-crossing according to the result of the temperature measurement made with the heater itself serving as a temperature sensor.

When a heater is made to double as a temperature sensor, it is necessary to prevent the A.C. power voltage supplied to the heater from being imposed directly to the circuit which processes the signal of temperature sensing. In case of applying diodes to prevent the A.C. voltage, the

UNITED STATES PATENT AND TRADEMARK OFFICE
CERTIFICATE OF CORRECTION

PATENT NO. : 4,636,619
DATED : January 13, 1987
INVENTOR(S) : Hideo SUGIMORI

It is certified that error appears in the above-indentified patent and that said Letters Patent is hereby corrected as shown below:

forward voltage drops in the diodes, being as low as about 0.6 v, can not be ingnored for a precision apparatus.

OBJECTS AND SUMMARY OF THE INVENTION

An object of the present invention is to provide a heater control device in which the heater temperature is precisely controlled with a temperature sensing signal obtained by the heater itself made to double as a temperature sensor with a heater driving A.C. voltage prevented from being imposed on the input teminals of a comparator constituting the control circuit.

Another object of the present invention is to constitute such a heater control device so that the control circuit operates at a small power dissipation.

According to the present invention a heater which is to be power-supplied from an A.C. power source through an A.C power switching element constitutes a bridge circuit together with accompanying resistors and diodes. This bridge circuit

UNITED STATES PATENT AND TRADEMARK OFFICE
CERTIFICATE OF CORRECTION

PATENT NO. : 4,636,619
DATED : January 13, 1987
INVENTOR(S) : Hideo SUGIMORI

It is certified that error appears in the above-indentified patent and that said Letters Patent is hereby corrected as shown below:

is made active only for short time durations of zero-crossings of the A.C. power voltage with the heater made to double as a temperature sensor. The temperature measured by the heater acting as a sensor is compared with a reference voltage, which is also geerated by the bridge circuit. The reference voltage is predetermined to correspond to a temperature value to which the heater is to be controlled. If the temperature of the heater is lower than the predetermined temperature value, the comparator outputs a trigger pulse to the gate of the A.C. power switching element, and makes the heater energized with the A.C. power. While the A.C. power is supplied to the heater, the diodes contained in the bridge circuit prevents the A.C. voltage from being supplied to the input terminals of the control circuit or the comparator.

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

BRIEF DESCRIPTION OF THE DRAWINGS

Figure 3:
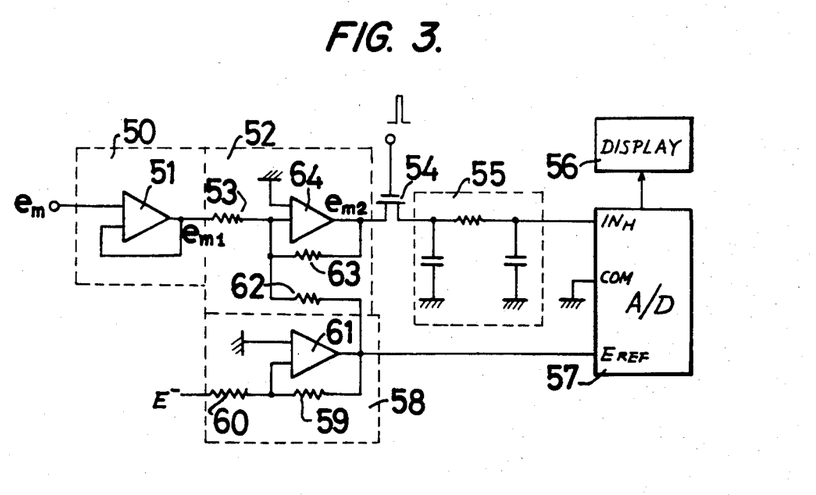
FIG. 3 shows a circuit construction of another embodiment of the present invention.
Figure 4:
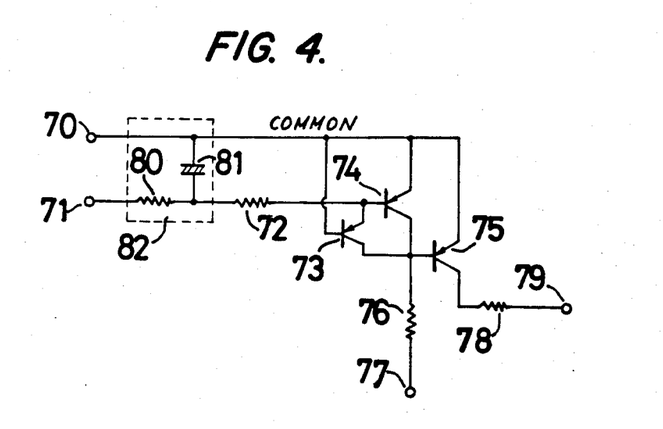
FIG. 4 shows the voltage and current wave forms observed at various points in the circuit shown in FIG. 3.

The present invention is further described in detail with reference to the accompanying drawings, in which;

Fig. 1 shows a circuit construction of an embodiment of the present invention;

Fig. 2 shows the time charts illustrating the performance of the above embodiment of the present invention;

Fig. 3 shows a circuit example of the display device for use in connection with the present invention;

Fig. 4 shows an example of the zero-cross detector preferably usable in the above embodiment of the present invention.

DETAILED DESCRIPTION OF THE INVENTION

There is shown in Fig. 1 the circuit construction of an embodiment of the present invention. A heater 1 is power-supplied from an A.C. power source 3 through a triac 2,

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

with one end of the heater 1 connected to a terminal 3A of the A.C. power source 3 through a common line 5 of the whole circuit. The positive terminal of a D.C. voltage source 4 is connected to the common line 5, while the negative terminal 6 is connected to the control circuit which is constituted as follows. A zero-cross detector 7 detects the zero-crossing of the A.C. power source, and generates through a terminal B a switching pulse to the base of a switching transistor 8. The switching transistor 8 supplys a D.C. current at each zero-cross timing of the A.C. power source to a bidge circuit consisting both of a branch comprising resistors 14, 15 and a diode 13 for generating a reference signal $e^S$ and of a branch comprising restors 9, 12, diodes 10, 11 and the heater 1 for detecting a temperature sensing signal $e^M$.

A part of this whole bridge, which part consists of the

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

diodes 10, 11, the resistors 9, 12 and the heater 1, constitutes a branch which outputs the temperature sensing signal $e^M$ at a point F, where the resistor 12 and the diode 11 are connected with each other. Currents $i^1$ and $i^2$ are supplied through the resistor 9 with the transistor 8 made conducting at the zero-crossings of the A.C. power source. The value of the resistor 12 is chosen to be much larger than that of the heater 1 to reflect the temperature sensed by the heater 1 on the resistor 12. Accordingly, the current $i^1$ passing through the heater 1 and the diode 11. A point H, at which the voltage drop on the heater 1 acting as a sensor, is connected also with the triac 2, where the A.C. power is supplied. However, the A.C. voltage is prevented by the diodes 10 and 11 from being imposed to the resistor 12. With such diode connections a negative half wave of the A.C. power voltage at the point H is prevented from

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

reaching the points D and F by the reverse cut-off characteristic of the diode 10, while a positive half cycle of the A.C. voltage, which passes through the diode 10 toward the point D, is prevented by the diode 11 from reaching the point F. Thus, only the temperature sensing voltage $e^M$ can be detected at the point F with both the half waves of the A.C. power voltage excluded. The forward voltage drop of the diode 10 due to the current $i^1$ and that of the diode 11 due to the current $i^2$ compensate each other so that the voltage drop at the point F may be kept equal to the voltage drop at the point H during the zero-cross timing of the A.C. voltage. The bridge arm consisting of the resistor 14, 15 and the diode 13, which is for generating the reference signal $e^S$ at the zero-cross timing, is protected by the diode 13 from the A.C. voltage. A positive half wave of the A.C. voltage is prevented by the diode 13, while a

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

negative half wave of the A.C. is prevented by the diode 10. The transistor 8 should be of a high-voltage type.

The temperature sensing signal $e^M$ appearing at the point F is inputted to one of the input terminals of a comparator 16 which compares the signal $e^M$ with the reference signal $e^S$ developed at the point E. The reference voltage can be set at a desired value by adjusting the resistor 15, corresponding to a temperature value at which the heater temperature is to be controlled. The comparator 16 generates a trigger signal to the triac 2 through a diode 17, while the temperature sensing signal voltage $e^M$ is smaller than the reference voltage $e^S$.

The function of the whole circuit is described with reference made to Fig. 2, which shows the time charts A to H representing the voltage observed at the points indicated with A to H in Fig. 1. In Fig. 2 a time interval I corresponds to the case in which a temperature sensing

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

voltage $e^M$ is not smaller than the voltage $e^S$ while a time interval II corresponds to the case in which the voltage $e^M$ is smaller than the voltage $e^S$. At the zero-crossings of the A.C. power voltage (time chart A) the triac 2 is kept non-conducting, but if the temperature measured is smaller than the reference temperature value, the triac 2 is triggered and made conducting during the half cycle following the zero-crossing at which the temperature is measured. In case the triac 2 is made conducting and the potential at the point A is in the half cycle (IIa) positive to the common line 5, that A.C. voltage appearing at the point D is prevented by the diode 11 from being imposed at the point F. Contrary, when the potential at the point A is in the negative half cycle (IIb), the A.C. voltage is prevented by the diode 10 from reaching the point D. In case the potential at the point A is in the positive half cycle, the A.C. voltage appears also at the point C as is

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

shown by the time chart C in Fig. 2. However, this voltage is prevented by the diode 13 from being imposed at the point E. In such a manner as is described above, both the $e^M$ and $e^S$ input terminals of the comparator 16 is protected from the A.C. power line voltage.

Fig. 3 shows an example of a display apparatus for displaying the temperature value $e_m$ which is measured each time the pulse signal is output from the zero-crossing detector. In the figure operational amplifiers 51 and 64 constitute an impedance converting circuit 50 and an adding circuit 52, respectively. The output $e_{m2}$ of the adding circuit 52 is given by an equation below, if $e_{m1}$ and $E_{REF}$ are input thereto:

$$e_{m2} = - \frac{R_2}{R_1} e_{m1} + \frac{R_2}{R_3} E_{REF}$$

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

where $R_1$, $R_2$ and $R_3$ are the resistance value of resistors 53, 63 and 62, respectively. An operational amplifier 61 constitutes a circuit to output a positive standard voltage $E_{REF}$ with a positive DC voltage E being input. A pulse signal from the zero-crossing detector is input to the gate of a FET 54 to make the FET conducting for the duration of the pulse signal. A sample holding circuit 55 holds the value $e_{m2}$, which is renewed for each pulse signal from the zero-crossing detector. An A-D converter 57 converts the output of the sample holding circuit to a digital value, which is visually shown on a display 56. By adjusting a resistance $R_3$ of the resistor 62 so that the output voltage may become 0 at a heater temperature of $0°C$, the output is proportional to a measured temperature.

Fig. 4 shows a circuit example of a zero-crossing detector, for which a commercially available IC unit may be used. In this circuit an A.C. voltage is input between

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

terminals 70 and 72, and a negative D.C. source is supplied to a terminal 77. A terminal 79 is the output terminal of the whole circuit. An integrating circuit 82 consisting of resistor 80 and a capacitor 81 is provided to delay the phase of an input A.C. voltage. While the absolute value of the output of the integrating circuit is efficiently high, either transistor 73 or 74 is alternately made conducting, and a transistor 75 is kept inactive, because the potential of its base rises substantially up to the common line potential due to the voltage developed in a resistor 76. The transistor 75 is made conducting only in a short time-width in which both of the transistors 73 and 74 are kept non-conducting due to the falling down of the absolute output of the integrating circuit 82 to a level equal to or lower than the emitter-base cut-off voltage of both the transistors 73 and 74. The width of the pulse signal

UNITED STATES PATENT AND TRADEMARK OFFICE
CERTIFICATE OF CORRECTION

PATENT : 4,636,619
DATED : January 13, 1987
INVENTOR(S) : Hideo SUGIMORI

It is certified that error appears in the above-identified patent and that said Letters Patent is hereby corrected as shown below:

obtained by this zero-crossing detector circuit is about 100 µ sec, while that of a conventional zero-crossing detector is about 300 to 400 µ sec. By employing this zero-cross detector the power consumption in the control circuit is reduced to about 1/3 to 1/4 of that in the conventional circuit.

Signed and Sealed this

Thirteenth Day of June, 1995

*Attest:*

BRUCE LEHMAN

*Attesting Officer*     *Commissioner of Patents and Trademarks*